Oct. 22, 1935.  A. LAPP  2,017,978
SAFETY VALVE FOR PNEUMATIC TIRES
Filed Dec. 9, 1933
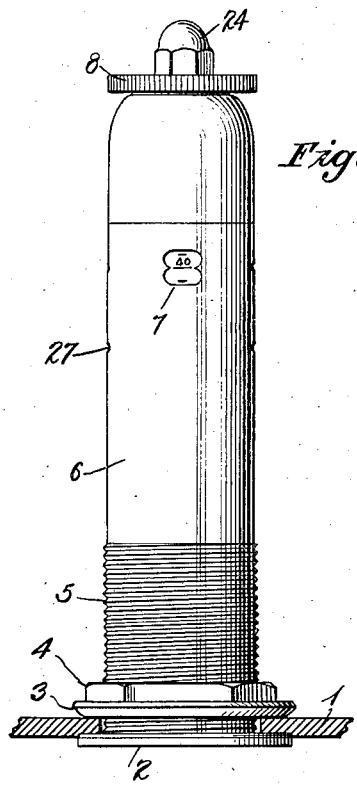
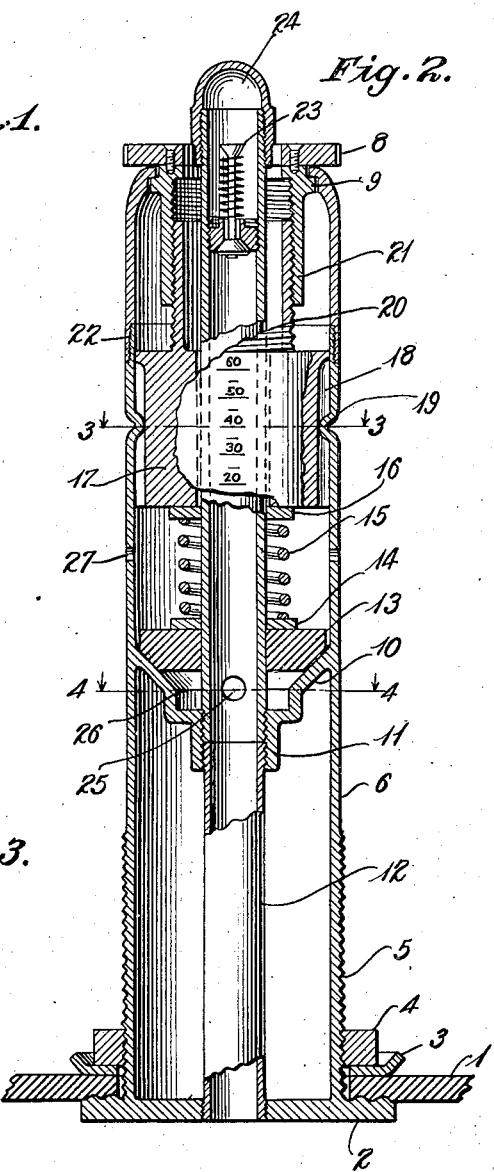
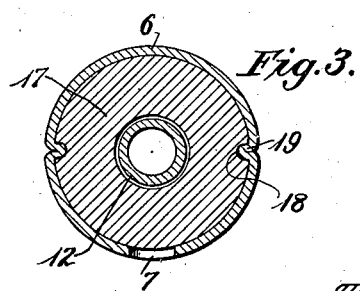
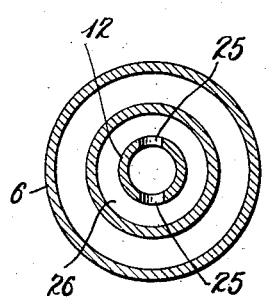
Inventor
Alex Lapp
By James P. Burns
Attorney Patented Oct. 22, 1935

2,017,978

UNITED STATES PATENT OFFICE 2,017,978

SAFETY VALVE FOR PNEUMATIC TIRES

Alex Lapp, Cleveland, Ohio

Application December 9, 1933, Serial No. 701,713

2 Claims. (Cl. 152—11.5)

This invention relates to a combined pneumatic tire safety valve and gauge.

It is the purpose of the invention to provide a safety valve which will automatically release the air from the tire when the air pressure therein exceeds the predetermined desired pressure for which the valve has been set. It frequently happens that tires are over-inflated due to carelessness or non-availability of a suitable tire gauge. By use of the present invention possibility of over-inflation is obviated.

The air pressure in a tire increases noticeably when driving over hot pavements in warm weather. The valve of the present invention insures a release of the excess pressure so developed.

In its more specific aspects the invention contemplates the provision of a safety valve adapted to be set at any selected appropriate pressure for the tire, which valve functions automatically and entirely independently of the air inlet valve.

It is a further object of the invention to provide a valve structure which is easily assembled, efficient in operation, and economical to manufacture.

Other and more detail objects and advantages of the invention will be made apparent as the description proceeds.

In the drawing,—

Figure 1 is a vertical view in side elevation of the complete valve;

Fig. 2 is a vertical view in cross section showing the working parts of the valve;

Fig. 3 is a sectional view taken on the line 3—3 of Figure 2, and

Fig. 4 is a similar sectional view taken on the line 4—4 of Figure 2.

Referring to the drawing, 1 designates the tire tube adapted to be clamped between the valve base plate 2 and the washer 3 by the threaded clamp nut 4 which engages threads 5 near the bottom of valve casing 6.

The valve casing 6 is provided with an opening 7 to permit reading of the pressure indicating calibrations. On the upper end of the top section of casing 6 there is a rotatably mounted cap 8 keyed to the casing 6 by keys 9 in a manner to permit relative rotation between the cap 8 and casing 6.

The casing 6 is provided about midway of its length with a partition member 10 internally threaded at 11. An air tube 12 is adapted to extend from end to end of the casing 6 and to threadedly engage threads 11 in the partition 10.

In assembling the valve structure, the tube 12 is first inserted in the casing 6 with the upper section of the casing 6 removed, and threaded through the partition 10. The exhaust valve plate 13 is next slipped down over the tube 12 and seats on the upper face of partition 10. A washer 14 is now passed down over tube 12 and forms a bearing for one end of the coil spring 15. A similar washer 16 rests on the upper end of spring 15. The calibrated nut 17 is next passed down over tube 12 with the recesses 18 of nut 17 in alignment with the inwardly extending projections 19 on the casing 6. The nut 17 terminates at its upper end in an externally threaded sleeve 20. It will be observed that the nut 17 can have vertical longitudinal movement in the casing but that it is held against rotation by the projections 19. The cap 8 and section 6a of the casing are last applied to the valve as a unit. The cap 8 carries the internally threaded sleeve 21 that screws down on the sleeve 20. Both sleeves 20 and 21 are threaded throughout their entire length to permit of a wide latitude of relative movement therebetween. Section 6a is screwed on to the main section 6 of the casing at 22.

The arrangement is such that when cap 8 is rotated after the valve structure is assembled, it causes nut 17 to be raised or lowered in casing 6 and to thereby vary the tension on spring 15 which in turn acts to hold the valve plate 13 in closed position.

In the upper end of tube 12 there is a conventional air inlet valve 23 which acts in response to the inlet air pressure. The upper end of the tube 12 is closed by a suitable cap 24.

The tube 12 is provided with openings 25 at a point in the compartment 26 formed between the valve plate 13 and the partition 10. The casing 6 is provided with air exhaust openings 27 above the valve plate 13.

The mode of operation is as follows: The cap 24 is removed and air admitted from the conventional air hose or pump through valve 23 and tube 12 to the tire. When the pressure for which nut 17 has been set is reached, the air in the tire, due to the openings 25 in tube 12, acts to lift valve plate 13 against the tension of spring 15 and permit the air to exhaust through openings 27 in the casing wall.

It will be observed that the nut 17 is calibrated with reference to the spring 15 and that it can be set to permit valve plate 13 to lift from its seat at any given pressure. The calibrations on nut 17 are visible through the opening 7 in the casing wall and permit one to set the pressure at which the valve will exhaust by merely rotating the cap 8 at the top of the casing.

What I claim is:—

1. A safety valve for pneumatic tires comprising an elongated casing having an open outer end, an air exhaust opening, a sight opening, and a partition formed in the bore thereof inwardly of said openings, said partition being constructed to provide an annular valve seat and an internally threaded sleeve spaced axially from said seat to form an air compartment between the seat and sleeve, an air tube arranged within said casing to be threaded into said partition sleeve and to project through the open outer end of the casing, said tube having an opening connecting its bore with said air compartment and an air inlet check valve adjacent its outer end, a safety exhaust valve slidable on said tube to cooperate with the valve seat for closing the outer side of said air compartment, said exhaust valve being of proper dimension to permit air to pass by the same to discharge through said air exhaust opening as soon as said valve leaves its seat, a spring encircling said tube to bear against said exhaust valve for holding said valve seated until a predetermined pressure is reached in said air chamber, a member adjustably guided on said tube to compress the spring against the exhaust valve for holding the valve seated until the desired air pressure is reached in said air compartment, said member having calibrations thereon to be seen through said sight opening, and means operable from the exterior of the casing for adjusting said member to vary the spring pressure on said exhaust valve.

2. A safety valve for pneumatic tires of the type referred to in claim 1 further characterized by the means for adjusting said member comprising a threaded sleeve formed on said member, a second sleeve threadedly connected to the first sleeve, means for journaling the second sleeve in the open outer end of the casing, and an operator located outside the casing and connected to said second sleeve to rotate said second sleeve relative to the first sleeve.

ALEX LAPP.